United States Patent
Wang et al.

(10) Patent No.: US 11,877,167 B2
(45) Date of Patent: Jan. 16, 2024

(54) MEASUREMENT MANAGEMENT METHOD AND TERMINAL DEVICE

(71) Applicant: GUANGDONG OPPO MOBILE TELECOMMUNICATIONS CORP., LTD., Guangdong (CN)

(72) Inventors: Shukun Wang, Guangdong (CN); Zhihua Shi, Guangdong (CN); Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/470,681

(22) Filed: Sep. 9, 2021

(65) Prior Publication Data
US 2022/0007221 A1    Jan. 6, 2022

Related U.S. Application Data

(63) Continuation of application No. PCT/CN2019/108700, filed on Sep. 27, 2019.

(51) Int. Cl.
*H04W 24/08* (2009.01)
*H04W 72/21* (2023.01)
*H04W 72/23* (2023.01)

(52) U.S. Cl.
CPC ........... *H04W 24/08* (2013.01); *H04W 72/21* (2023.01); *H04W 72/23* (2023.01)

(58) Field of Classification Search
CPC ........... H04W 72/042; H04W 72/1289; H04W 48/12; H04L 5/0096
See application file for complete search history.

(56) References Cited

U.S. PATENT DOCUMENTS

| | | | |
|---|---|---|---|
| 2016/0308653 A1* | 10/2016 | Dinan | H04W 52/02 |
| 2019/0103954 A1 | 4/2019 | Lee et al. | |
| 2019/0124558 A1* | 4/2019 | Ang | H04W 72/042 |
| 2019/0215136 A1 | 7/2019 | Zhou et al. | |
| 2019/0254110 A1 | 8/2019 | He et al. | |
| 2020/0029316 A1* | 1/2020 | Zhou | H04W 72/042 |
| 2020/0229081 A1* | 7/2020 | Ang | H04W 72/042 |
| 2020/0245184 A1* | 7/2020 | Jin | H04L 45/74 |
| 2020/0314745 A1* | 10/2020 | Yi | H04W 72/23 |
| 2020/0374725 A1* | 11/2020 | Chen | H04L 5/0051 |

(Continued)

FOREIGN PATENT DOCUMENTS

CN    109588064    4/2019

OTHER PUBLICATIONS

LG Electronics, "Discussion on power saving for CA operation," 3GPP TSG RAN WG1 Meeting #95, R1-1812591, Nov. 2018, 3 pages.

(Continued)

*Primary Examiner* — Bo Hui A Zhu
(74) *Attorney, Agent, or Firm* — Hodgson Russ LLP (57) ABSTRACT

A measurement management method and terminal device are provided. The method includes the following. A terminal device determines a first bandwidth part (BWP) when a first serving cell of the terminal device is in a first state, where beam management (BM) measurement with respect to the first serving cell is performed in the first BWP, and the first state includes a dormant state or an activated state with dormancy behavior.

14 Claims, 3 Drawing Sheets

(56) References Cited

U.S. PATENT DOCUMENTS

2021/0352654 A1* 11/2021 Al .......................... H04B 7/02

OTHER PUBLICATIONS

Ericsson, "Summary#2 of Efficient and low latency serving cell configuration/activation/setup," 3GPP TSG RAN WG1 Meeting #96bis, R1-1905900. Apr. 2019, 11 pages.
LG Electronics, "Discussion on power saving for CA operation," 3GPP TSG RAN WG1 Meeting#94bis, R1-1810312, Oct. 2018, 3 pages.
Qualcomm Incorporated, "Fast SCG and SCell Activation," 3GPP TSG-RAN WG1 #97, R1-1907306, May 2019, 11 pages.
OPPO, "Introduction of dormant Scell state," 3GPP TSG-RAN2#106, R2-1905591, Apr. 2019, 3 pages.
WIPO, International Search Report for PCT/CN2019/108700, dated Jun. 23, 2020.
"3rd Generation Partnership Project; Technical Specification Group Radio Access Network; NR; Physical layer procedures for control (Release 16)," 3GPP TS 38.213. Sep. 2020, v16.3.0, 179 pages.
"3rd Generation Partnership Project; Technical Specification Group Radio Access Network; NR; NR and NG-RAN Overall Description; Stage 2 (Release 16)," 3GPP TS 38.300, Sep. 2020, v16.3.0, 148 pages.
"3rd Generation Partnership Project; Technical Specification Group Radio Access Network; NR; Medium Access Control (MAC) protocol specification (Release 16)," 3GPP TS 38.321, Sep. 2020, v16.2.1, 153 pages.
"3rd Generation Partnership Project; Technical Specification Group Radio Access Network; NR; Radio Resource Control (RRC) protocol specification (Release 16)," 3GPP TS 38.331, Sep. 2020, v16.2.0, 919 pages.
Ericsson, "Summary #3 of efficient and low latency serving cell configuration/activation/setup", 3GPP TSG RAN WG1 Meeting #98, Aug. 30, 2019, R1-1909865.
EPO, Extended European Search Report for EP 19946464.5, dated Apr. 14, 2022.
IPI, First Examination Report for IN 202127041063, dated May 20, 2022.
CNIPA, First Office Action for CN Application No. 202110615168.3, dated Sep. 13, 2022.
Intel Corporation et al., "[I715, I716] Implementation details of BWP for 6-1a UE features," 3GPP TSG-RAN WG2 meeting #103, R2-1811677, Aug. 2018.
ZTE Corporation et al., "Discussion on the RAN2 impacts with the BWP terminologies introduced in RAN1," 3GPP TSG-RAN WG2 Meeting #100, R2-1712601, Nov. 2017.
CNIPA, Second Office Action for CN Application No. 202110615168.3, dated Nov. 29, 2022.
CIPO, Office Action for CA Application No. 3137981, dated Dec. 9, 2022.
ZTE Corporation, "Discussion on low latency SCell activation," 3GPP TSG RAN WG1 Meeting #97, R1-1906422, May 2019.
EPO, Communication for EP Application No. 19946464.5, dated Jan. 24, 2023.
Qualcomm Incorporated, "UE Adaptation to the Traffic and UE Power Consumption Characteristics," 3GPP TSG-RAN WG1 Meeting #94bis, R1-1811282, Oct. 2018.
JPO, Office Action for JP Application No. 2021-562017, dated Aug. 8, 2023.

* cited by examiner

A TERMINAL DEVICE DETERMINES A FIRST BWP WHEN A FIRST SERVING CELL OF THE TERMINAL DEVICE IS IN A FIRST STATE, WHERE BM MEASUREMENT WITH RESPECT TO THE FIRST SERVING CELL IS PERFORMED ON THE FIRST BWP, AND THE FIRST STATE INCLUDES A DORMANT STATE OR AN ACTIVATED STATE WITH DORMANCY BEHAVIOR — 301

MEASUREMENT MANAGEMENT METHOD AND TERMINAL DEVICE

CROSS REFERENCE TO RELATED APPLICATION(S)

This application is a continuation of International Application No. PCT/CN2019/108700, filed on Sep. 27, 2019, the disclosure of which is hereby incorporated by reference in its entirety.

TECHNICAL FIELD

This disclosure relates to the field of mobile communication technology, and more particularly to a measurement management method and apparatus, and a communication device.

BACKGROUND

In a long term evolution (LTE) system, there is no concept of bandwidth part (BWP) and no concept of beam management (BM), and thus there is no BM measurement related mechanism. In a new radio (NR) system, the concept of BWP and the concept of BM have been introduced, and a BM measurement mechanism needs to be specified.

SUMMARY

In a first aspect, a measurement management method is provided. The method includes the following. A terminal device determines a first bandwidth part (BWP) when a first serving cell of the terminal device is in a first state, where beam management (BM) measurement with respect to the first serving cell is performed in the first BWP, and the first state includes a dormant state or an activated state with dormancy behavior.

In a second aspect, a terminal device is provided. The apparatus includes a transceiver, a memory configured to store computer programs, and a processor configured to invoke and execute the computer programs stored in the memory to: determine a first BWP when a first serving cell of a terminal device is in a first state, where BM measurement with respect to the first serving cell is performed in the first BWP, and the first state includes a dormant state or an activated state with dormancy behavior.

In a third aspect, a non-transitory computer readable storage medium is provided. The non-transitory computer readable storage medium is configured to store computer programs. The computer programs are operable with a computer to: determine a first bandwidth part (BWP) when a first serving cell of a terminal device is in a first state, wherein beam management (BM) measurement with respect to the first serving cell is performed in the first BWP, and the first state comprises one of a dormant state or an activated state with dormancy behavior.

BRIEF DESCRIPTION OF THE DRAWINGS

The accompanying drawings described herein are intended for further understanding of implementations and constitute some implementations of the disclosure. Exemplary implementations provided herein as well as elaborations thereof are intended for explaining, rather than limiting, the disclosure. In the accompanying drawings.

DETAILED DESCRIPTION

The following will describe technical solutions of implementations with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

The technical solutions of implementations are applicable to various communication systems, for example, a long term evolution (LTE) system, an LTE frequency division duplex (LTE-FDD) system, an LTE time division duplex (LTE-TDD) system, a $5^{th}$ generation (5G) system, or a future communication system.

Figure 1:
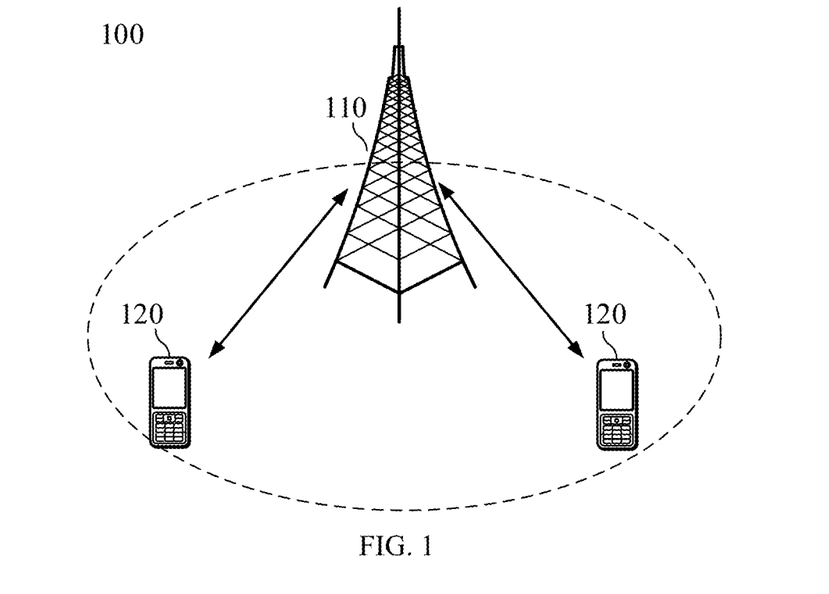
FIG. 1 is a schematic architectural diagram of a communication system according to implementations.

FIG. 1 illustrates a communication system 100 of implementations. The communication system 100 may include a network device 110. The network device 110 may be a device that can communicate with a terminal device 120 (also referred to as "communication terminal" or "terminal"). The network device 110 can provide a communication coverage for a specific geographical area and communicate with terminal devices in the coverage area. The network device 110 may be an evolved Node B (eNB or eNodeB) in the LTE system, or may be a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future communication system.

The communication system 100 further includes at least one terminal device 120 located in the coverage area of the network device 110. The "terminal device" referred to herein can include but is not limited to a device configured to communicate via a wired line, another data connection/network, and/or a wireless interface, a device which is part of another terminal device and configured to receive/transmit communication signals, or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", and/or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browser, notebook, calendar, and/or global positioning system (GPS) receiver, and/or a conventional laptop, a handheld receiver, or other electronic devices equipped with a radio telephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in a future evolved public land mobile network (PLMN), etc.

As an example, terminal devices 120 can communicate with each other through device to device (D2D) communication.

As an example, the 5G system or 5G network can also be referred to as an NR system or NR network.

FIG. 1 exemplarily illustrates one network device and two terminal devices. The communication system 100 may also include multiple network devices, and there can be other numbers of terminal devices in a coverage area of each of the network devices, which is not limited herein.

The communication system 100 may further include other network entities such as a network controller, a mobile management entity, or the like, and the disclosure is not limited in this regard.

According to implementations, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, the disclosure is not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In order for better understanding of the technical solutions of implementations, the following will describe in detail technical solutions related to the implementations herein.

In order for better understanding of the technical solutions of implementations, the following will describe in detail related technologies of implementations. Any combination of the related technologies and the technical solutions of implementations shall fall within the protection scope of the disclosure.

With people's pursuit of speed, low latency, high-speed mobility and energy efficiency, and diversity and complexity of services in future life, the $3^{rd}$ generation partnership project (3GPP) international standard organization began develop 5G. 5G is mainly applied to: enhanced mobile broadband (eMBB), ultra-reliable low-latency communications (URLLC), and massive machine-type communications (mMTC).

On one hand, eMBB is still aimed at obtaining multimedia content, services, and data for users and grows rapidly in demand. On the other hand, because eMBB may be deployed in different scenarios, such as indoor, urban, rural areas, etc., its capabilities and requirements vary widely. Therefore, analysis of eMBB should depend on specific deployment scenarios. Typical applications of URLLC include: industrial automation, power automation, telemedicine operations, and traffic safety assurance. mMTC is typically characterized by: high connection density, small amount of data, delay-insensitive services, low cost of modules, and long service life.

In an early deployment of NR, complete NR coverage is difficult to obtain, and therefore typical network coverage modes are wide-area LTE coverage and island coverage of NR. In addition, a large amount of LTE is deployed below 6 GHz (gigahertz), with few spectrums below 6 GHz available for 5G. Therefore, it is necessary to conduct research on applications of spectrum above 6 GHz in NR. However, high-frequency bands have limited coverage and are fast in signal fading. In addition, in order to protect early investment of mobile operators in LTE, a tight interworking mode between LTE and NR is proposed.

3GPP first completed the first 5G version, namely, evolved universal terrestrial radio access-NR (E-UTRA-NR dual connectivity, EN-DC). In EN-DC, an LTE eNB serves as a master node (MN), and an NR 5G Node B (gNB) serves as a secondary node (SN). The MN is mainly responsible for a control function of radio resource control (RRC) and responsible for a control plane leading to a core network (CN). The SN can be configured with auxiliary signaling, such as signaling radio bearer (SRB) 3, which mainly provides data transmission functions. In addition to EN-DC, DC may also be NR evolved universal terrestrial radio access (NR-E-UTRA, NE)-DC, 5G core network (5GC)-EN-DC, NR DC, etc.

Figure 2A:
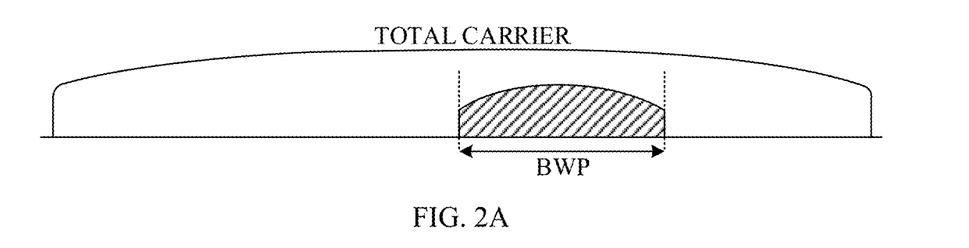
FIG. 2A is a schematic diagram of a bandwidth part (BWP) according to implementations.
Figure 2B:
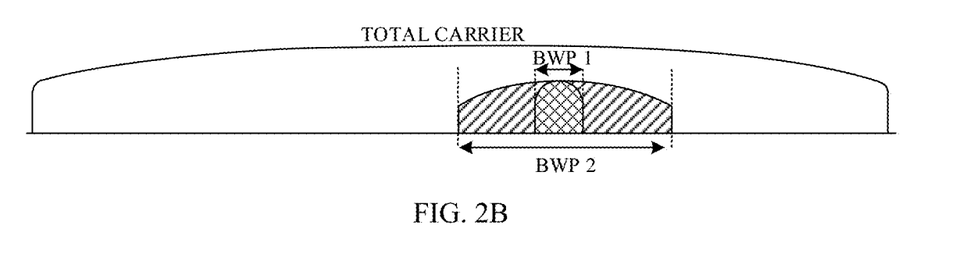
FIG. 2B is a schematic diagram of a BWP according to other implementations.
Figure 2C:
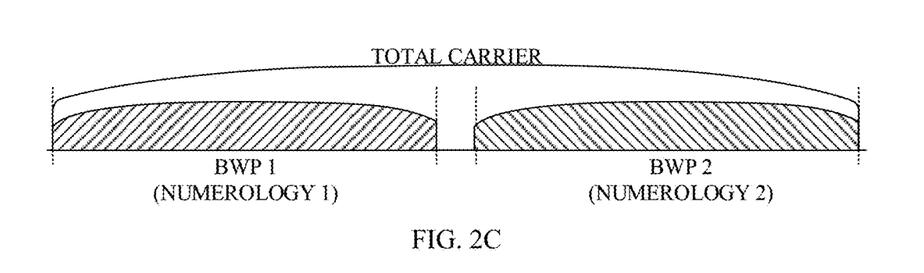
FIG. 2C is a schematic diagram of a BWP according to other implementations.

In 5G, a maximum channel bandwidth (referred to as wideband carrier) can be 400 MHZ (megahertz). Compared with a maximum bandwidth of 20M (megabits per second, Mbps) in LTE, the bandwidth of the wideband carrier is very large. If the terminal device remains operating on the wideband carrier, it will result in high power consumption of the terminal device. Therefore, it is desirable that a radio frequency (RF) bandwidth of the terminal device is adjusted according to a practical throughput of the of the terminal device. To this end, the concept of BWP is introduced. BWP is intended for optimizing power consumption of the terminal device. For example, if the terminal device has low requirements on speed, the terminal device can be configured with a small BWP (as illustrated in FIG. 2A). If the terminal device has high requirements on speed, the terminal device can be configured with a large BWP (as illustrated in FIG. 2B). If the terminal device supports high rates or operates in a carrier aggregation (CA) mode, the terminal device can be configured with multiple BWPs (as illustrated in FIG. 2C). On the other hand, BWP is also intended for triggering coexistence of multiple numerologies in a cell. As illustrated in FIG. 2C, BWP 1 corresponds to numerology 1, and BWP 2 corresponds to numerology 2.

Through RRC dedicated signaling, the terminal device can be configured with up to 4 uplink (UL) BWPs and up to 4 downlink (DL) BWPs, but only a single UL BWP and a single DL BWP can be activated at the same time. In the RRC dedicated signaling, a BWP that is activated first (i.e. initial active BWP) among the configured BWPs can be indicated. In addition, while the terminal device is in a connected state, it is also possible to switch between different BWPs through downlink control information (DCI).

The terminal device performs radio link monitor (RLM) only in an active BWP(s), rather than in an inactive BWP. When the terminal device switches between different BWPs, there is no need to reset an RLM-related timer and an RLM-related counter. For radio resource management (RRM) measurement, no matter which active BWP is used for the terminal device to transmit and receive data, it will not affect RRM measurement. For channel quality indication (CQI) measurement, the terminal device also performs CQI measurement in an active BWP(s) only.

In NR, CQI is mainly used for evaluation of quality of a DL channel of a cell, which is measured and reported by the terminal device. The terminal device measures a corresponding pilot signal (i.e. reference signal (RS)) according to a higher-layer instruction, and then reports a CQI measurement result (also referred to as CQI measurement report). A network side determines, according to the CQI measurement result reported by the terminal device and a present resource condition of a network, whether to adjust modulation mode, resource allocation, and multiple-input multiple-output (MIMO) related configurations of the terminal device.

In NR, a signal indicating CQI measurement is a channel status indicator reference signal (CSI-RS), which is configured for the terminal device by the network side. The network side controls, through a media access control-control element (MAC CE), whether to perform CQI measurement (if the network side notifies not to perform CQI measurement, the network side will not transmit the CSI-RS).

A CQI reporting mode includes periodic CQI reporting and aperiodic CQI reporting. For the periodic CQI reporting, a reporting period is configured at the network side. The aperiodic CQI reporting is indicated through DCI. CQI reporting indicated by DCI may also be periodic reporting, where a period thereof is configured in RRC signaling.

A CQI transmission channel includes a physical uplink shared channel (PUSCH) and a physical uplink control channel (PUCCH). For a subframe with no PUSCH allocated, periodic CQI reporting/precoding matrix indicator (PMI) reporting/rank indication (RI) reporting is transmitted on a PUCCH. For a subframe with a PUSCH allocated, periodic reporting is transmitted on the PUSCH in the form of channel-associated signaling. If periodic reporting and aperiodic reporting occur in the same subframe, the terminal device will first transmit aperiodic reporting in the subframe.

In order to meet requirements on high speed, 5G also supports CA technology. In CA, resources on multiple component carriers (CC) are jointly scheduled and used, such that an NR system can support a larger bandwidth, thereby achieving a higher system peak rate. In terms of contiguity of aggregated carriers on a spectrum, CA can include contiguous CA and non-contiguous CA. In terms of whether the aggregated carriers are in the same band, CA can include intra-band CA and inter-band CA.

In CA, there is one and only one primary cell component (PCC). The PCC provides RRC signaling connection, a non-access stratum (NAS) function, security, etc. A PUCCH exists on the PCC and only on the PCC. In CA, there can be one or more secondary cell components (SCC). The SCC only provides additional radio resources. The PCC and the SCC are both referred to as serving cells, where a cell on the PCC is a primary cell (Pcell), and a cell on the SCC is a secondary cell (Scell). It is also specified in a standard that at most 5 carriers can be aggregated, that is, a maximum bandwidth after aggregation is 100 MHZ, and the aggregated carriers belong to the same base station. All of the aggregated carriers use the same cell-radio network temporary identifier (C-RNTI), and the base station can ensure that there is no conflict on C-RNTI in cells of each carrier. Since both asymmetric CA and symmetric CA are supported, there must be a DL carrier among the aggregated carriers, but it is possible to include no UL carrier. In addition, for a PCC cell, there must be a physical downlink control channel (PDCCH) and a PUCCH of the PCC cell, and only the PCC cell has a PUCCH, while other SCC cells may have a PDCCH.

In CA, in terms of a carrier on which a PDCCH resource used for scheduling is located, carrier scheduling includes same-carrier scheduling and cross-carrier scheduling. Same-carrier scheduling means that scheduling information of a carrier is placed on a PDCCH of the carrier for scheduling. Cross-carrier scheduling, on the other hand, means that scheduling information of a carrier is placed on another carrier for scheduling. The introduction of cross-carrier scheduling is intended for interference avoidance of a heterogeneous network.

In cross-carrier scheduling, scheduling information of different carriers is distinguished by a carrier indicator field (CIF) in DCI. The CIF is indicative of the serial number of a carrier. The CIF occupies constant 3 bits and is valued from 0 to 7. A CIF of the PCC is fixed at 0. There may be multiple carriers having a PDCCH, but the PCC must have its own PDCCH. Higher layer configures a PDCCH of which carrier to be used for a present SCC for scheduling.

The Scell is configured through RRC dedicated signaling. An initially configured state is a deactivated state, and in the deactivated state, data transmission and reception cannot be performed. Data transmission and reception can be performed only after the Scell is activated through a MAC CE. From a perspective of the Scell configuration and activation delay, this architecture is not an optimal architecture. Such a delay decreases usage efficiency of CA and efficiency of a radio resource, especially in a small-cell deployment scenario. In a dense small-cell deployment scenario, a signaling load of each Scell is very high, especially in the case where each Scell needs to be configured separately. Therefore, such a CA architecture results in an additional delay, thus restricting use of CA and reducing gain of CA load sharing.

To this end, LTE R15 has optimized CA in terms of the following functions.

Dormant Scell state: A state of the Scell includes an activated state and an inactive state. In order for quick recovery of a cell, a new cell state is defined, namely a dormant state. In the dormant state, the terminal device performs CQI measurement/RRM measurement and reports a CQI measurement result/RRM measurement result, without decoding a PDCCH. In addition, a new MAC CE is introduced for controlling of dormant state transition. The new MAC CE is used for controlling transition between the activated state and the dormant state. In the new MAC CE, 1 bit corresponds to one Scell. If the value of the bit is set to be 1, it indicates that the Scell enters the dormant state. If the value of the bit is set to be 0, it indicates that the Scell enters the activated state.

Direct Scell state configuration: The state of the Scell is configured as the activated state or the dormant state in RRC signaling. The state of the Scell defaults to be the inactive state.

In NR, a beam sweeping process has been introduced. In order to perform BM, the network side configures for each cell a BM-related measurement RS (a measurement RS is associated with a beam), and notifies the BM-related measurement RS to the terminal device. The terminal device reports on a PUCCH measurement results of these BM-related measurement RSs to the network side. The network side indicates, according to the measurement results, a set of beams having good quality through a MAC CE, and indicates, through DCI, which beam is in use among the set of beams having good quality.

In LTE, the concept of dormant state has been introduced for the Scell. According to implementations herein, in NR, the concept of dormant state is not introduced for the Scell, but the concept of dormancy behavior is introduced, that is, the Scell can have dormancy behavior. A state in which a cell has dormancy behavior is referred to as a first state. The first state referred to herein is different from the dormant state in LTE. Since the concept of BWP has been introduced in NR, for a cell having dormancy behavior, when the terminal device performs BM measurement, there is no need to perform BM measurement in all BWPs of the cell, and instead, it is only necessary to perform BM measurement in one of the BWPs. The following will describe in detail technical solutions of implementations.

Figure 3:
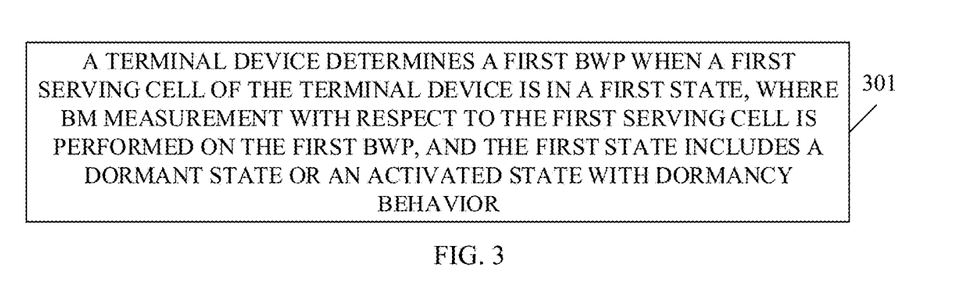
FIG. 3 is a schematic flowchart of a measurement management method according to implementations.

FIG. 3 is a schematic flowchart of a measurement management method according to implementations. As illustrated in FIG. 3, the method includes the following.

At block 301, a terminal device determines a first BWP when a first serving cell of the terminal device is in a first state, where BM measurement with respect to the first serving cell is performed in the first BWP, and the first state includes a dormant state or an activated state with dormancy behavior.

According to implementations, the first serving cell refers to any kind of cell that provides service for the terminal device. As an example, the first serving cell is an Scell.

In implementations herein, the concept of dormancy behavior has been introduced for a serving cell. A state of the serving cell with dormancy behavior is referred to as the first state. Although dormancy behavior is defined for the serving cell, dormancy behavior is the behavior of the terminal device. Dormancy behavior is in cell granularity. "Serving cell 1 enters the first state" may mean that the terminal device has dormancy behavior in serving cell 1. Similarly, "serving cell 2 enters the first state" may mean that the terminal device has dormancy behavior in serving cell 2.

In some implementations, in the first serving cell that is in the first state, behavior of the terminal device includes at least one of: performing RRM measurement, CQI measurement, and/or BM measurement; reporting an RRM measurement result, a CQI measurement result, and/or a BM measurement result; stopping monitoring a PDCCH; stopping transmitting a PUCCH, a PUSCH, and/or a sounding reference signal (SRS); or stopping receiving a physical downlink shared channel (PDSCH).

The terminal device can determine that the first serving cell enters the first state, in any one of the following manners.

(1) Manner 1

In some implementations, the terminal device receives first indication information transmitted by a network device, where the first indication information is used for indicating that the first serving cell enters the first state. The terminal device determines, according to the first indication information, that the first serving cell enters the first state.

In some implementations, the first indication information is carried in at least one of: RRC signaling, a MAC CE, or a PDCCH.

(2) Manner 2

In other implementations, when a first timer expires, the terminal device determines that the first serving cell enters the first state.

In some implementations, configuration information of the first timer is carried in at least one of: RRC signaling, a MAC CE, or a PDCCH.

According to implementations, the first BWP refers to a BWP on which the terminal device performs BM measurement in the first serving cell that enters the first state. For the first serving cell that enters the first state, there is no need for the terminal device to perform BM measurement in all BWPs of the first serving cell, and instead, it is only necessary to perform BM measurement in one BWP (that is, the first BWP).

The terminal device can determine the first BWP in which BM measurement needs to be performed, in any one of the following manners.

(A) Manner 1

In some implementations, the terminal device receives second indication information transmitted by the network device, where the second indication information is indicative of an identity (ID) of the first BWP. The terminal device determines the first BWP according to the ID of the first BWP.

In some implementations, the second indication information is carried in at least one of: RRC signaling, a MAC CE, or a PDCCH.

The network device can explicitly indicate, through the second indication information, an ID of a configured BWP (that is, the ID of the first BWP). The terminal device can determine, according to the second indication information, the BWP corresponding to the ID of the BWP (that is, the first BWP).

(B) Manner 2

In other implementations, the terminal device uses an initial active BWP configured in first configuration information as the first BWP. In some implementations, the first configuration information is carried in RRC signaling.

Through the RRC signaling, the network device can configure a group of BWPs (for example, 4 UL BWPs and 4 DL BWPs) for the terminal device, and indicate the initial active BWP. Here, configuration information in the RRC signaling is referred to as the first configuration information. The first configuration information is at least used for configuring the initial active BWP. The terminal device takes the initial active BWP as a BWP on which BM measurement is performed under dormancy behavior (that is, the first BWP).

(C) Manner 3

In other implementations, the terminal device uses an active BWP carrying the first indication information as the first BWP, where the first indication information is used for indicating that the first serving cell enters the first state.

Here, the terminal device takes an active BWP, which carries the received indication information indicative of dormancy behavior (that is, the first indication information), as a BWP in which BM measurement is performed under dormancy behavior (that is, the first BWP).

Technical solutions of implementations further propose different BM measurement reporting mechanisms, which will be hereinafter described in detail.

(I) BM Measurement Reporting Mechanism 1

In some implementations, for each of one or more serving cells of the terminal device, the serving cell configured with a PUCCH is not allowed to enter the first state (that is, dormancy behavior is not allowed).

Here, it can be specified in a protocol that the serving cell configured with a PUCCH cannot have dormancy behavior.

(II) BM Measurement Reporting Mechanism 2

In other implementations, for each of one or more serving cells of the terminal device, the serving cell configured with a PUCCH is allowed to enter the first state (that is, dormancy behavior is allowed), where a BM measurement result of the serving cell is transmitted through a PUCCH of a target cell. In some implementations, the target cell is a PCell. Alternatively, the target cell is indicated by the network device.

Here, it can be specified in a protocol that the serving cell configured with a PUCCH can have dormancy behavior, but the BM measurement results of each of all serving cells of a serving cell group corresponding to the PUCCH is reported through the PUCCH of the PCell, or reported through a PUCCH of a serving cell explicitly configured by a network side.

In implementations herein, if a cell configured with a PUCCH is in the first state, how to report a BM measurement result needs to be specified. Therefore, the following BM mechanisms are proposed, which will be hereinafter described in detail.

(a) BM Mechanism 1

For a serving cell with dormancy behavior, the network side does not issue transmission configuration indicator (TCI) states activation/deactivation for maintenance of good beams. However, if measurement results of each of all beams of the terminal device are inadequate, or the number of inadequate beams is less than a threshold value, the network side reconfigures a BM RS set through RRC signaling.

(b) BM Mechanism 2

In some implementations, the terminal device performs BM measurement with respect to the first serving cell in the first BWP, to obtain measurement results corresponding to each of M RSs, where M is a positive integer and M>1. The terminal device determines, according to the measurement results corresponding to each of the M RSs, whether to report the BM measurement result and/or whether to transmit third indication information to the network device, where the third indication information is used for instructing the network device to reconfigure a BM RS set.

In some implementations, the terminal device determines, from the measurement results corresponding to each of the M RSs, measurement results corresponding to each of N RSs which are less than a first measurement threshold, where N is a positive integer, and 1≤N≤M. When N is less than or equal to a first threshold, the terminal device reports the BM measurement result, and/or transmits the third indication information to the network device.

Here, the terminal device does not always report the BM measurement result to the network device. The terminal device reports the BM measurement result only when the number of RSs, of which measurement results are less than the first measurement threshold, is less than the first threshold.

In other implementations, upon determining that all of the measurement results corresponding to each of the M RSs are less than the first measurement threshold, the terminal device reports the BM measurement result to the network device, and/or transmits the third indication information to the network device.

In some implementations, the first threshold is configured by the network device or specified in a protocol.

In some implementations, the first measurement threshold is configured by the network device or specified in a protocol.

The first measurement threshold includes at least one of: a reference signal received power (RSRP) threshold, a reference signal received quality (RSRQ) threshold, or a signal to interference plus noise ratio (SINR) threshold. Accordingly, a measurement result corresponding to an RS includes at least one of: an RSRP measurement result, an RSRQ measurement result, or an SINR measurement result.

In some implementations, the terminal device receives second configuration information transmitted by the network device, where the second configuration information is used for determining a first measurement-reporting period, the first measurement-reporting period is used for the terminal device to report a first-type BM measurement result, and the first-type BM measurement result is a BM measurement result obtained by performing BM measurement on a serving cell that enters the first state. In some implementations, the first measurement-reporting period is longer than a second measurement-reporting period, the second measurement-reporting period is used for the terminal device to report a second-type BM measurement result, and the second-type BM measurement result is a BM measurement result obtained by performing BM measurement on a serving cell that enters the activated state.

For a serving cell with dormancy behavior, the network side configures the first measurement-reporting period that is longer than the second measurement-reporting period corresponding to a serving cell in the activated state. The first measurement-reporting period is used for reporting a BM measurement result when a serving cell has dormancy behavior.

After the terminal device reports the BM measurement result, and/or transmits the third indication information to the network device, the network device reconfigures a BM RS set for the terminal device. In some implementations, the terminal device receives third configuration information transmitted by the network device, where the third configuration information is used for reconfiguring a BM RS set.

Technical solutions of implementations further propose a mechanism of transition between the first state and the activated state of a serving cell, which will be elaborated below.

All the serving cells are classified into different serving cell groups. Each serving cell group has a group ID, and each serving cell in the serving cell group has an index number. The serving cell referred to herein may be an Scell.

In some implementations, the terminal device receives a first PDCCH, where the first PDCCH includes a group ID of a first serving cell group and a first bitmap corresponding to the first serving cell group, each bit in the first bitmap corresponds to one serving cell in the first serving cell group, and for each bit in the first bitmap, a value of the bit is indicative of whether a serving cell corresponding to the bit enters the activated state or whether a serving cell corresponding to the bit enters the first state.

As an example, if the value of a bit is 1 (or 0), it indicates that a serving cell corresponding to the bit enters the first state (or the serving cell does not enter the first state). As another example, if the value of a bit is 1 (or 0), it indicates that a serving cell corresponding to the bit enters the first state (or the serving cell enters the activated state).

In other implementations, the terminal device receives a first PDCCH, where the first PDCCH includes an ID of a first serving cell group, a first CIF, and a first bit, the first CIF is indicative of one serving cell in the first serving cell group, and a value of the first bit is indicative of whether the serving cell enters the activated state or whether the serving cell enters the first state.

As an example, if the value of a bit is 1 (or 0), it indicates that a serving cell corresponding to the bit enters the first state (or the serving cell does not enter the first state). As another example, if the value of a bit is 1 (or 0), it indicates that a serving cell corresponding to the bit enters the first state (or the serving cell enters the activated state).

Figure 4:
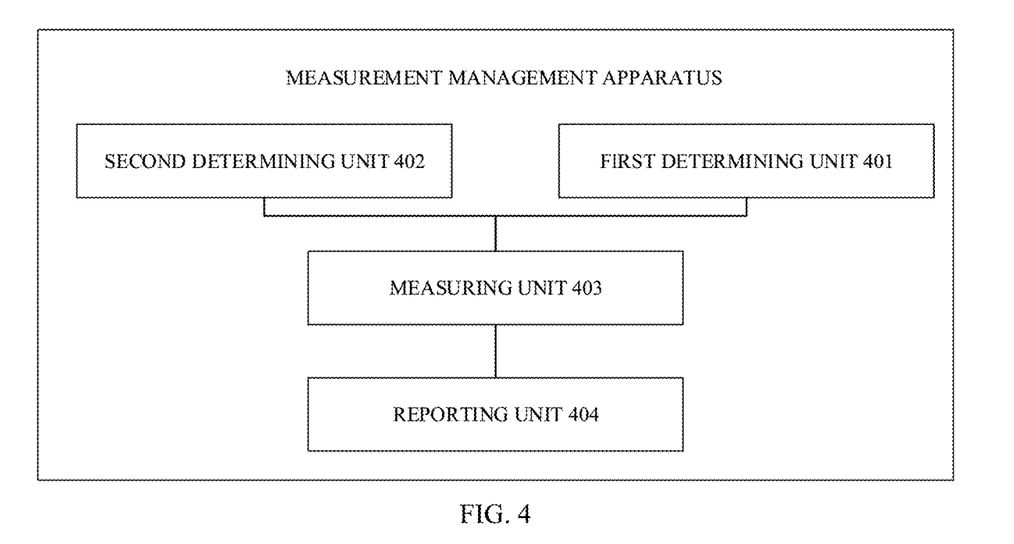
FIG. 4 is a schematic structural diagram of a measurement management apparatus according to implementations.

FIG. 4 is a schematic structural diagram of a measurement management apparatus according to implementations. As illustrated in FIG. 4, the apparatus includes a first determining unit 401. The first determining unit 401 is configured to determine a first BWP when a first serving cell of a terminal device is in a first state, where BM measurement with respect to the first serving cell is performed in the first BWP, and the first state includes a dormant state or an activated state with dormancy behavior.

In some implementations, the apparatus further includes a second determining unit 402. The second determining unit 402 is configured to operate as follows. The second determining unit 402 is configured to receive first indication information transmitted by a network device, where the first indication information is used for indicating that the first serving cell enters the first state. The second determining unit 402 is configured to determine, according to the first indication information, that the first serving cell enters the first state.

In some implementations, the first indication information is carried in at least one of: RRC signaling, a MAC CE, or a PDCCH.

In other implementations, the apparatus further includes the second determining unit 402. The second determining unit 402 is configured to determine that the first serving cell enters the first state, when a first timer expires.

In some implementations, configuration information of the first timer is carried in at least one of: RRC signaling, a MAC CE, or a PDCCH.

In some implementations, the first determining unit 401 is configured to operate as follows. The first determining unit 401 is configured to receive second indication information transmitted by the network device, where the second indication information is indicative of an ID of the first BWP. The first determining unit 401 is configured to determine the first BWP according to the ID of the first BWP.

In some implementations, the second indication information is carried in at least one of: RRC signaling, a MAC CE, or a PDCCH.

In other implementations, the first determining unit 401 is configured to use an initial active BWP configured in first configuration information as the first BWP.

In some implementations, the first configuration information is carried in RRC signaling.

In other implementations, the first determining unit 401 is configured to use an active BWP, in which the first indication information is carried, as the first BWP, where the first indication information is used for indicating that the first serving cell enters the first state.

In some implementations, for each of one or more serving cells of the terminal device, the serving cell configured with a PUCCH is not allowed to enter the first state.

In other implementations, for each of one or more serving cells of the terminal device, the serving cell configured with a PUCCH is allowed to enter the first state, where a BM measurement result of the serving cell is transmitted through a PUCCH of a target cell.

In some implementations, the target cell is a PCell. Alternatively, the target cell is indicated by the network device.

In some implementations, the apparatus further includes a measuring unit 403 and a reporting unit 404. The measuring unit 403 is configured to perform BM measurement with respect to the first serving cell in the first BWP, to obtain measurement results corresponding to each of M RSs, where M is a positive integer and M>1. The reporting unit 404 is configured to determine, according to the measurement results corresponding to each of the M RSs, whether to report a BM measurement result and/or whether to transmit third indication information to the network device, where the third indication information is used for instructing the network device to reconfigure a BM RS set.

In some implementations, the reporting unit 404 is configured to operate as follows. The reporting unit 404 is configured to determine, from the measurement results corresponding to each of the M RSs, measurement results corresponding to each of N RSs which are less than a first measurement threshold, where N is a positive integer, and 1≤N≤M. The reporting unit 404 is configured to report the BM measurement result, and/or transmit the third indication information to the network device, when N is less than or equal to a first threshold.

In other implementations, the reporting unit 404 is configured to report the BM measurement result, and/or transmit the third indication information to the network device, when the terminal device determines that all of the measurement results corresponding to each of the M RSs are less than the first measurement threshold.

In some implementations, the first threshold is configured by the network device or specified in a protocol.

In some implementations, the first measurement threshold is configured by the network device or specified in a protocol.

In some implementations, the apparatus further includes a receiving unit (not illustrated in FIG. 4). The receiving unit is configured to receive second configuration information transmitted by the network device, where the second configuration information is used for determining a first measurement-reporting period, the first measurement-reporting period is used for the terminal device to report a first-type BM measurement result, and the first-type BM measurement result is a BM measurement result obtained by performing BM measurement on a serving cell that enters the first state.

In some implementations, the first measurement-reporting period is longer than a second measurement-reporting period, the second measurement-reporting period is used for the terminal device to report a second-type BM measurement result, and the second-type BM measurement result is a BM measurement result obtained by performing BM measurement on a serving cell that enters the activated state.

In other implementations, the apparatus further includes the receiving unit. The receiving unit is configured to receive third configuration information transmitted by the network device, where the third configuration information is used for reconfiguring a BM RS set.

In some implementations, the apparatus further includes the receiving unit. The receiving unit is configured to receive a first PDCCH, where the first PDCCH includes an ID of a first serving cell group and a first bitmap corresponding to the first serving cell group, each bit in the first bitmap corresponds to one serving cell in the first serving cell group, and for each bit in the first bitmap, a value of the bit is indicative of whether a serving cell corresponding to the bit enters the activated state or whether a serving cell corresponding to the bit enters the first state.

In other implementations, the apparatus further includes the receiving unit. The receiving unit is configured to receive a first PDCCH, where the first PDCCH includes an ID of a first serving cell group, a first CIF, and a first bit, the first CIF is indicative of one serving cell in the first serving cell group, and a value of the first bit is indicative of whether the serving cell enters the activated state or whether the serving cell enters the first state.

In some implementations, behavior of the terminal device, which is in the first serving cell that is in the first state, includes at least one of: performing RRM measurement, CQI measurement, and/or BM measurement; reporting an RRM measurement result, a CQI measurement result, and/or a BM measurement result; stopping monitoring a PDCCH; stopping transmitting a PUCCH, a PUSCH, and/or an SRS; or stopping receiving a PDSCH.

It should be understood by those skilled in the art that, for details of the apparatus described above, reference can be made to related descriptions of the foregoing method for understanding.

Figure 5:
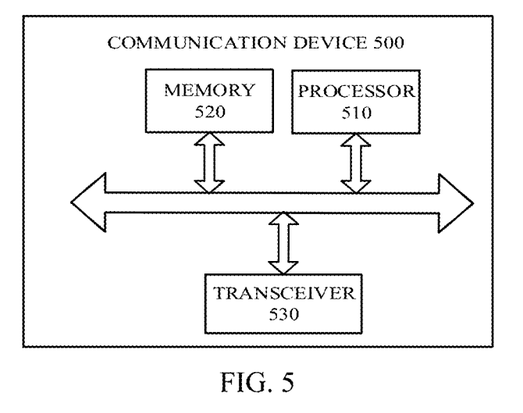
FIG. 5 is a schematic structural diagram of a communication device according to implementations.

FIG. 5 is a schematic structural diagram of a communication device 500 according to implementations. The communication device may be operable as a terminal device, or may be operable as a network device. As illustrated in FIG. 5, the communication device 500 includes a processor 510. The processor 510 can invoke and execute computer programs stored in a memory to perform the method provided in implementations.

As illustrated in FIG. 5, the communication device 500 can further include the memory 520. The processor 510 can invoke and execute the computer programs stored in the memory 520 to perform the method provided in implementations.

The memory 520 may be a separate device independent of the processor 510, or may be integrated into the processor 510.

As illustrated in FIG. 5, the communication device 500 can further include a transceiver 530. The processor 510 can control the transceiver 530 to communicate with other devices, for example, to send information or data to other devices, or to receive information or data from other devices.

The transceiver 530 may include a transmitter and a receiver. The transceiver 530 may further include an antenna, where one or more antennas can be provided.

The communication device 500 may be operable as the network device of implementations, and the communication device 500 can implement the operations performed by the network device described in the foregoing method implementations, which will not be repeated herein for the sake of simplicity.

Alternatively, the communication device 500 may be operable as the mobile terminal/the terminal device of implementations, and the communication device 500 can implement the operations performed by the mobile terminal/the terminal device described in the foregoing method implementations, which will not be repeated herein for the sake of simplicity.

Figure 6:
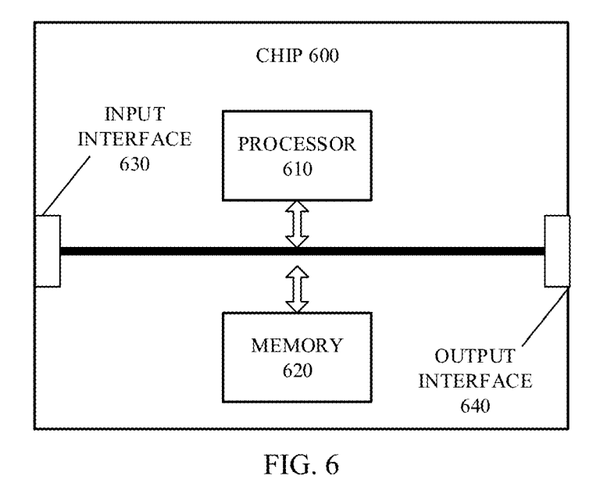
FIG. 6 is a schematic structural diagram of a chip according to implementations.

FIG. 6 is a schematic structural diagram of a chip according to implementations. As illustrated in FIG. 6, the chip 600 includes a processor 610. The processor 610 is configured to invoke and execute computer programs stored in a memory to perform the method provided in implementations.

As illustrated in FIG. 6, the chip 600 further includes the memory 620. The processor 610 can invoke and execute the computer programs stored in the memory 620 to perform the method provided in implementations.

The memory 620 may be a separate device independent of the processor 610, or may be integrated into the processor 610.

The chip 600 may further include an input interface 630. The processor 610 can control the input interface 630 to communicate with other devices or chips, for example, to acquire information or data sent by other devices or chips.

The chip 600 may further include an output interface 640. The processor 610 can control the output interface 640 to communicate with other devices or chips, for example, to output information or data to other devices or chips.

The chip is applicable to the network device of implementations. The chip can implement the operations performed by the network device described in the foregoing method implementations, which will not be repeated herein for the sake of simplicity.

Alternatively, the chip is applicable to the mobile terminal/the terminal device of implementations. The chip can implement the operations performed by the mobile terminal/the terminal device described in the foregoing method implementations, which will not be repeated herein for the sake of simplicity.

It should be understood that, the chip herein may also be referred to as a system-on-chip (SOC).

Figure 7:
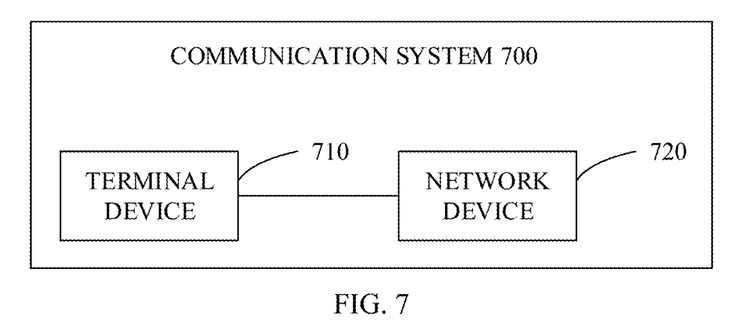
FIG. 7 is a schematic block diagram of a communication system according to implementations.

FIG. 7 is a schematic block diagram of a communication system 700 according to implementations. As illustrated in FIG. 7, the communication system 700 includes a terminal device 710 and a network device 720.

The terminal device 710 can implement functions of the foregoing method which are implemented by a terminal device, and the network device 720 can implement functions of the foregoing method which are implemented by a network device, which will not be repeated herein for the sake of simplicity.

It should be understood that, the processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or execute the methods, steps, and logic blocks disclosed in implementations. The general purpose processor may be a microprocessor, or the processor may be any conventional processor or the like. The steps of the method disclosed in implementations may be implemented directly through a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory according to implementations may be a volatile memory or a non-volatile memory, or may include both the volatile memory and the non-volatile memory. The non-volatile memory may be a ROM, a PROM, an erasable PROM (EPROM), an electrically EPROM (EEPROM), or a flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ES-DRAM), a synchronous link DRAM (synch-link DRAM, SLDRAM), and a direct rambus RAM (DRRAM). The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc.

In other words, the memory of implementations is intended to include, but is not limited to, these and any other suitable types of memory.

Implementations further provide a computer readable storage medium. The computer readable storage medium is configured to store computer programs.

The computer readable storage medium is applicable to the network device of implementations. The computer programs are operable with a computer to implement the operations performed by the network device described in the foregoing method implementations, which will not be repeated herein for the sake of simplicity.

Alternatively, the computer readable storage medium is applicable to the mobile terminal/the terminal device of implementations. The computer programs are operable with a computer to implement the operations performed by the mobile terminal/the terminal device described in the foregoing method implementations, which will not be repeated herein for the sake of simplicity.

Implementations further provide a computer program product. The computer program product includes computer program instructions.

The computer program product is applicable to the network device of implementations. The computer program instructions are operable with a computer to implement the operations performed by the network device described in the foregoing method implementations, which will not be repeated herein for the sake of simplicity.

Alternatively, the computer program product is applicable to the mobile terminal/the terminal device of implementations. The computer program instructions are operable with a computer to implement the operations performed by the mobile terminal/the terminal device described in the foregoing method implementations, which will not be repeated herein for the sake of simplicity.

Implementations further provide a computer program.

The computer program is applicable to the network device of implementations. The computer program, when executed by a computer, is operable with the computer to implement the operations performed by the network device described in the foregoing method implementations, which will not be repeated herein for the sake of simplicity.

Alternatively, the computer program is applicable to the mobile terminal/the terminal device of implementations. The computer program, when executed by a computer, is operable with the computer to implement the operations performed by the mobile terminal/the terminal device described in the foregoing method implementations, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and other manners of division may also available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the integrated units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A measurement management method, comprising:
  determining, by a terminal device, a first bandwidth part (BWP) when a first serving cell of the terminal device, including a primary cell, is in a first state, wherein beam management (BM) measurement with respect to the first serving cell is performed in the first BWP, and the first state is an activated state with dormancy behavior, where the terminal device stops monitoring a physical downlink control channel (PDCCH) and performs one of a radio resource management (RRM) measurement, a channel quality indication (CQI) measurement, and BM measurement;
  receiving, by the terminal device, first indication information transmitted by a network device, wherein the first indication information is used for indicating that the first serving cell enters the first state;
  receiving, by the terminal device, a first PDCCH, wherein the first PDCCH carries an ID of a first serving cell group and a first bitmap corresponding to the first serving cell group; and
  determining, by the terminal device, according to the first indication information, that the first serving cell enters the first state;
  wherein determining, by the terminal device, the first BWP comprises:
    receiving, by the terminal device, second indication information transmitted by a network device, wherein the second indication information is indicative of an identity (ID) of the first BWP; and
    determining, by the terminal device, the first BWP according to the ID of the first BWP;
  wherein the second indication information is carried in radio resource control (RRC) signaling;
  wherein behavior of the terminal device, which is in the first serving cell that is in the first state, comprises:
    stopping transmission of a PUCCH, a physical uplink shared channel (PUSCH), and a sounding reference signal (SRS).

2. The method of claim 1, wherein the first indication information is carried in at least one of: the radio resource control (RRC) signaling, a media access control-control element (MAC CE), or the PDCCH.

3. The method of claim 1, wherein for each of one or more serving cells of the terminal device, a serving cell configured with a physical uplink control channel (PUCCH) is not allowed to enter the first state.

4. The method of claim 1, wherein:
  each bit in the first bitmap corresponds to one serving cell in the first serving cell group, and for each bit in the first bitmap, a value of the bit is indicative of whether a serving cell corresponding to the bit enters the activated state or whether a serving cell corresponding to the bit enters the first state.

5. The method of claim 1, wherein behavior of the terminal device, which is in the first serving cell that is in the first state, comprises at least one of:
  reporting at least one of an RRM measurement result, a CQI measurement result, or a BM measurement result; and
  stopping receiving a physical downlink shared channel (PDSCH).

6. A terminal device, comprising:
  a transceiver;
  a memory configured to store computer programs; and
  a processor configured to invoke and execute the computer programs stored in the memory to:
    determine a first bandwidth part (BWP) when a first serving cell of the terminal device, including a primary cell, is in a first state, wherein beam management (BM) measurement with respect to the first serving cell is performed in the first BWP, and the first state comprises one of a dormant state or an activated state with dormancy behavior, where the terminal device stops monitoring a physical downlink control channel (PDCCH) and performs one of a radio resource management (RRM) measurement, a channel quality indication (CQI) measurement, and BM measurement;
  wherein the transceiver is configured to:
    receive first indication information transmitted by a network device, wherein the first indication information is used for indicating that the first serving cell enters the first state;
  wherein the processor is further configured to:
    determine, according to the first indication information, that the first serving cell enters the first state;
  wherein the transceiver is further configured to:
    receive second indication information transmitted by the network device, wherein the second indication information is indicative of an identity (ID) of the first BWP; and
    receive a first PDCCH, wherein the first PDCCH comprises an ID of a first serving cell group and a first bitmap corresponding to the first serving cell group; and
  wherein the processor is further configured to:
    determine the first BWP according to the ID of the first BWP;
  wherein the second indication information is carried in radio resource control (RRC) signaling;
  wherein behavior of the terminal device, which is in the first serving cell that is in the first state, comprises:
    stopping transmission of a PUCCH, a physical uplink shared channel (PUSCH), and a sounding reference signal (SRS).

7. The terminal device of claim 6, wherein the first indication information is carried in at least one of: the RRC signaling, a media access control-control element (MAC CE), or the PDCCH.

8. The terminal device of claim 6, wherein for each of one or more serving cells of the terminal device, a serving cell configured with a physical uplink control channel (PUCCH) is not allowed to enter the first state.

9. The terminal device of claim 6, wherein
  each bit in the first bitmap corresponds to one serving cell in the first serving cell group, and for each bit in the first bitmap, a value of the bit is indicative of whether a serving cell corresponding to the bit enters the activated state or whether a serving cell corresponding to the bit enters the first state.

10. The terminal device of claim 6, wherein behavior of the terminal device, which is in the first serving cell that is in the first state, comprises at least one of:

reporting at least one of an RRM measurement result, a CQI measurement result, or a BM measurement result; and stopping receiving a physical downlink shared channel (PDSCH).

11. A non-transitory computer readable storage medium configured to store computer programs which are operable with a computer to:

determine a first bandwidth part (BWP) when a first serving cell of a terminal device, including a primary cell, is in a first state, wherein beam management (BM) measurement with respect to the first serving cell is performed in the first BWP, and the first state is an activated state with dormancy behavior where the terminal device stops monitoring a physical downlink control channel (PDCCH) and performs one of an RRM measurement, a CQI measurement, and BM measurement;

wherein the computer programs are further operable with the computer to:

receive first indication information transmitted by a network device, wherein the first indication information is used for indicating that the first serving cell enters the first state; and determine that the first serving cell enters the first state, according to the first indication information;

receive a first PDCCH, wherein the first PDCCH comprises an ID of a first serving cell group and a first bitmap corresponding to the first serving cell group;

wherein determining the first BWP includes:

receiving second indication information transmitted by a network device, wherein the second indication information is indicative of an identity (ID) of the first BWP; and determining the first BWP according to the ID of the first BWP;

wherein the second indication information is carried in radio resource control (RRC) signaling;

wherein behavior of the terminal device, which is in the first serving cell that is in the first state, comprises: stopping transmission of a PUCCH, a physical uplink shared channel (PUSCH), and a sounding reference signal (SRS).

12. The non-transitory computer readable storage medium of claim 11, wherein each bit in the first bitmap corresponds to one serving cell in the first serving cell group, and for each bit in the first bitmap, a value of the bit is indicative of whether a serving cell corresponding to the bit enters the activated state or whether a serving cell corresponding to the bit enters the first state.

13. A measurement management method, comprising:

determining, by a terminal device, a first bandwidth part (BWP) when a first serving cell of the terminal device, including a primary cell, is in a first state, wherein beam management (BM) measurement with respect to the first serving cell is performed in the first BWP, and the first state comprises one of a dormant state or an activated state with dormancy behavior where the terminal device stops monitoring a physical downlink control channel (PDCCH) and performs one of an RRM measurement, a CQI measurement, and BM measurement;

receiving a first PDCCH, wherein the first PDCCH comprises an ID of a first serving cell group and a first bitmap corresponding to the first serving cell group;

wherein for each of one or more serving cells of the terminal device, a serving cell configured with a physical uplink control channel (PUCCH) is not allowed to enter the first state;

wherein determining the first BWP includes:

receiving second indication information transmitted by a network device, wherein the second indication information is indicative of an identity (ID) of the first BWP; and determining the first BWP according to the ID of the first BWP;

wherein the second indication information is carried in radio resource control (RRC) signaling;

wherein behavior of the terminal device, which is in the first serving cell that is in the first state, comprises: stopping transmission of a PUCCH, a physical uplink shared channel (PUSCH), and a sounding reference signal (SRS).

14. The method of claim 13, wherein:

each bit in the first bitmap corresponds to one serving cell in the first serving cell group, and for each bit in the first bitmap, a value of the bit is indicative of whether a serving cell corresponding to the bit enters the activated state or whether a serving cell corresponding to the bit enters the first state.

* * * * *